United States Patent
Field et al.

(10) Patent No.: US 7,849,323 B2
(45) Date of Patent: Dec. 7, 2010

(54) PASSWORD PRESENTATION FOR MULTIMEDIA DEVICES

(75) Inventors: John Field, Chatham, NJ (US); Burton S. Kaliski, Jr., Wellesley, MA (US); Magnus Nyström, Vallentuna (SE); James Townsend, Brookline, NH (US)

(73) Assignee: EMC Corporation, Hopkinton, MA (US)

( * ) Notice: Subject to any disclaimer, the term of this patent is extended or adjusted under 35 U.S.C. 154(b) by 1067 days.

(21) Appl. No.: 11/556,506

(22) Filed: Nov. 3, 2006

(65) Prior Publication Data
US 2007/0113294 A1 May 17, 2007

Related U.S. Application Data

(60) Provisional application No. 60/734,946, filed on Nov. 9, 2005.

(51) Int. Cl.
*G06F 21/00* (2006.01)
(52) U.S. Cl. ........................ 713/184; 380/201
(58) Field of Classification Search ................. 713/841, 713/184, 183, 185, 167, 193, 194; 380/201
See application file for complete search history.

(56) References Cited

U.S. PATENT DOCUMENTS

| | | | | |
|---|---|---|---|---|
| 5,361,062 A * | 11/1994 | Weiss et al. | ................. | 340/5.26 |
| 5,485,519 A * | 1/1996 | Weiss | ........................ | 713/185 |
| 5,657,388 A * | 8/1997 | Weiss | ........................ | 713/185 |
| 6,385,388 B1 * | 5/2002 | Lewis et al. | .................... | 386/94 |
| 6,799,226 B1 * | 9/2004 | Robbin et al. | ................. | 710/15 |
| 7,100,049 B2 * | 8/2006 | Gasparini et al. | ........... | 713/170 |
| 7,136,487 B1 * | 11/2006 | Schon et al. | ................. | 380/229 |
| 7,278,024 B2 * | 10/2007 | Sundararajan et al. | ...... | 713/183 |
| 7,360,085 B2 * | 4/2008 | Loveria, III | ................. | 713/165 |
| 2003/0054881 A1 * | 3/2003 | Hedrick et al. | ................ | 463/29 |
| 2003/0063894 A1 * | 4/2003 | Chiao et al. | ................... | 386/52 |
| 2003/0101230 A1 * | 5/2003 | Benschoter et al. | ......... | 709/217 |
| 2003/0120741 A1 * | 6/2003 | Wu et al. | .................... | 709/213 |

(Continued)

OTHER PUBLICATIONS

"Buyer Protection," RSA Vantage Magazine, Fall 2004, 6 pages.

(Continued)

*Primary Examiner*—Matthew B Smithers
*Assistant Examiner*—Abu Sholeman
(74) *Attorney, Agent, or Firm*—Ryan, Mason & Lewis LLP

(57) ABSTRACT

A multimedia device or other type of processing device comprises a memory, a processor coupled to the memory, and playback circuitry coupled to the processor. In one aspect, the processor is operative to control the storage in the memory of at least one multimedia file containing a one-time password or other type of password, where the password is generated externally to the processing device, and to control the playback of the multimedia file via the playback circuitry to make the password apparent to or otherwise accessible to an associated user or other entity. The multimedia file may comprise, for example, an audio file, with the password being presented to the user in an audible form upon playback of the audio file. As another example, the multimedia file may comprise a video file, with the password being presented to the user in a visible form upon playback of the video file.

28 Claims, 3 Drawing Sheets

U.S. PATENT DOCUMENTS

| | | | |
|---|---|---|---|
| 2003/0204734 A1* | 10/2003 | Wheeler | 713/184 |
| 2005/0166263 A1* | 7/2005 | Nanopoulos et al. | 726/7 |
| 2006/0041759 A1* | 2/2006 | Kaliski et al. | 713/184 |
| 2006/0174104 A1* | 8/2006 | Crichton et al. | 713/155 |
| 2006/0277098 A1* | 12/2006 | Chung et al. | 705/14 |
| 2007/0033649 A1* | 2/2007 | Henriksen | 726/20 |

OTHER PUBLICATIONS

"ASB Bank Selects RSA® Mobile Two-Factor Authentication for Internet Security," RSA Security press release, Jun. 18, 2003, 3 pages.

M. Nystrom, "The Protected One-Time Password Protocol (EAP-POTP)," RSA Security, IETF Network Working Group, Internet-Draft, Sep. 26, 2006, pp. 1-79.

S. Haykin et al., "The Cocktail Party Problem," Massachusetts Institute of Technology, Neural Computation, Feb. 2005, pp. 1875-1902, vol. 17.

"About Sonify.org," http://www.sonify.org/home/about.html, Jun. 13, 2006, 2 pages.

* cited by examiner

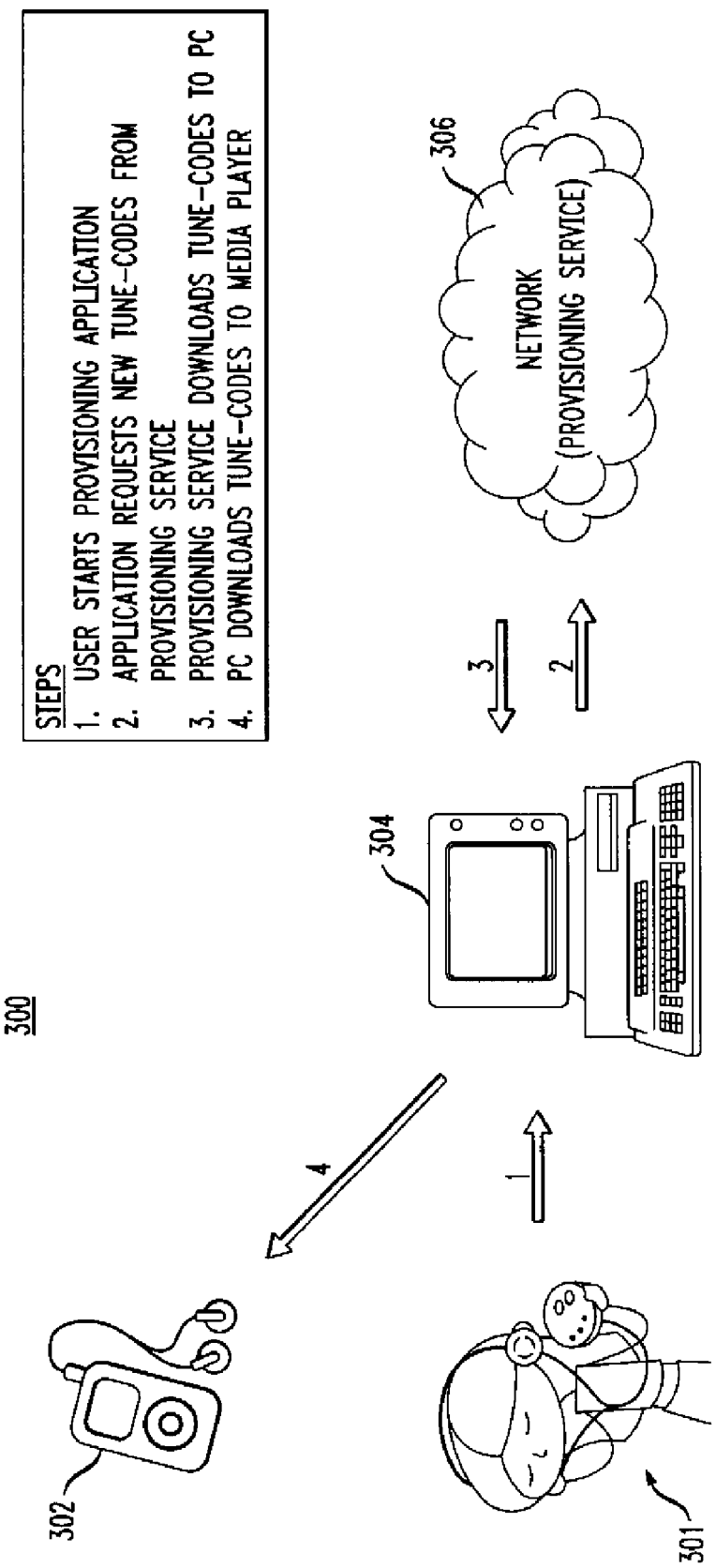

PASSWORD PRESENTATION FOR MULTIMEDIA DEVICES

RELATED APPLICATION(S)

The present application claims the priority of U.S. Provisional patent application Ser. No. 60/734,946, filed Nov. 9, 2005 and entitled "Tune-Codes: Audio One-Time Passwords for Multimedia Devices," which is incorporated by reference herein.

FIELD OF THE INVENTION

The present invention relates generally to secure access techniques, and more specifically to the generation and presentation of passwords used for secure access.

BACKGROUND OF THE INVENTION

The growing need for better user authentication, especially in consumer settings such as online banking, is drawing increased attention to technologies such as one-time passwords. In a one-time password system, a user typically carries a device or "token" that generates and displays a series of passwords over time. The user reads the currently displayed password and enters it into a personal computer, e.g., via a Web browser, as part of an authentication operation. Such a system offers a significant improvement over conventional password-based authentication since the password is dynamic and random. Previously misappropriated one-time passwords are of no help to an attacker in determining the current password, which remains hard to guess.

One particular example of a one-time password device of the type described above is the RSA SecurID® user authentication token, commercially available from RSA, The Security Division of EMC Corporation, of Bedford, Mass., U.S.A.

There are a number of challenges in realizing the potential of one-time password technology on a broad scale, however, most notably the complexity of providing one-time password devices to many users. Although such a device itself is not expensive, the logistics involved in distributing hardware to users can be substantial. In addition, unless the device is preprogrammed with a secret seed from which to generate one-time passwords, the seed must be provisioned in the field. This may require special device-specific protocols.

For these reasons, organizations have been considering alternative implementations of one-time password technology based on devices that the user already has, such as a mobile phone or a multimedia device. Such implementations avoid the logistics of separate authentication device distribution. However, enabling such devices to generate and display one-time passwords conveniently is not straightforward. The devices are designed for a different primary purpose, and it may be difficult to install and use new software for the secondary purpose of user authentication. The user interface is one such challenge: It may take a large number of "clicks" just to start the one-time password application.

These factors are obstacles to broader deployment of one-time password technology on a scale comparable, say, to the adoption of multimedia devices such as MP3 players.

Accordingly, a need exists for a device which is capable of providing one-time passwords to users while avoiding the above-noted deployment difficulties and other problems associated with conventional one-time password devices.

SUMMARY OF THE INVENTION

The present invention in an illustrative embodiment comprises a multimedia device that presents passwords to users by playing one or more corresponding multimedia files that may be downloaded from a computer, network or other system element.

In accordance with one aspect of the invention, a multimedia device or other type of processing device comprises a memory, a processor coupled to the memory, and playback circuitry coupled to the processor. The processor is operative to control the storage in the memory of at least one multimedia file containing a one-time password or other type of password, where the password is generated externally to the processing device, and to control the playback of the multimedia file via the playback circuitry to make the password accessible to an associated user, computer or other entity.

By way of example, the multimedia file may comprise an audio file, with the password being presented to the user in an audible form upon playback of the audio file. As another example, the multimedia file may comprise a video file, with the password being presented to the user in a visible form upon playback of the video file. Combinations of audio and video may also be used in presenting the password to the user.

The techniques of the illustrative embodiments overcome one or more of the problems associated with the conventional techniques described previously. For example, one-time passwords may be provided in audible or visible form using a multimedia device without any significant modification to the device itself, and without the need to store within the device the seed or other information used to generate the password. Such an arrangement considerably facilitates the widespread deployment of one-time password devices.

These and other features and advantages of the present invention will become more readily apparent from the accompanying drawings and the following detailed description.

BRIEF DESCRIPTION OF THE DRAWINGS

FIGS. 3 and 4 are diagrams showing respective authentication and provisioning processes in illustrative embodiments of the invention.

DETAILED DESCRIPTION

The present invention will be described herein with reference to an example one-time password system in which a processing device downloads multimedia files containing one-time passwords. It is to be appreciated, however, that the invention is not restricted to use in this or any other particular system configuration.

Additional details regarding certain conventional cryptographic techniques referred to herein may be found in, e.g., A. J. Menezes et al., Handbook of Applied Cryptography, CRC Press, 1997, which is incorporated by reference herein.

The term "password" as used herein is intended to be construed broadly, so as to encompass any type of authentication data that may be required in order to obtain access to an access-controlled application or other resource. Thus, the term is intended to encompass, for example, numeric or alphanumeric codes, sets of words, sentences, phrases, answers to questions, responses to challenges, or any other type of authentication data.

The term "multimedia device" is also intended to be construed broadly, so as to encompass, for example, an MP3 player or other digital audio player, a mobile telephone, a personal computer or any other type of processing device capable of presenting audio information and/or visual information. A "multimedia file," also referred to herein as simply a media file, is a file that is suitable for processing on a multimedia device. Such a file may comprise audio, video, or both, as well as additional supporting information such as file names, titles, identifiers, sources, etc. A text file that comprises textual information only, and no audio or video information, is not considered a multimedia file as that term is used herein. Thus, a multimedia file as defined herein must include at least one of audio and video. A multimedia file is said to "contain" a password if, for example, playing back the multimedia file makes the password audibly and/or visually apparent to a user.

Also, although the illustrative embodiments are described in the context of one-time passwords, that is, passwords that are typically used only for a single access, other embodiments can use passwords that are not limited to single use, that is, passwords that each can be used for two or more accesses.

The present invention in an illustrative embodiment provides an improved one-time password device comprising an otherwise conventional multimedia device that is configured to play one-time passwords to a user in an audible form. Alternative embodiments can present such passwords in a visible form, or using combinations of audible and visible form.

Figure 1:
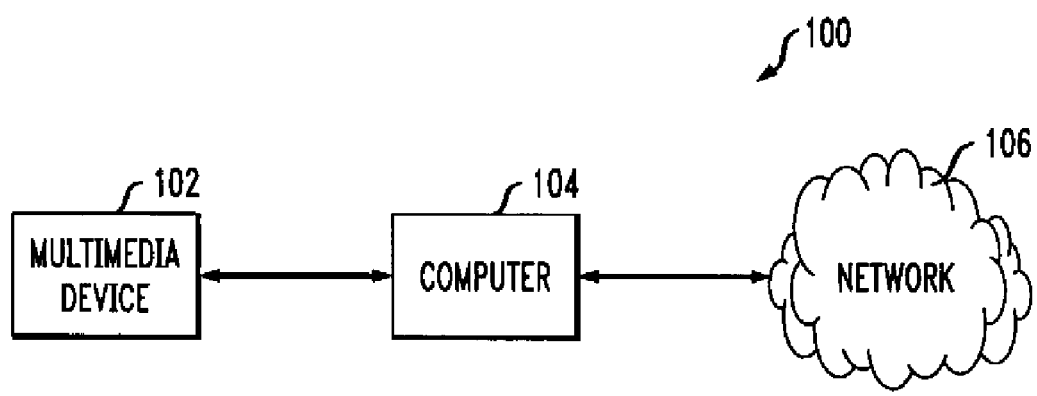
FIG. 1 is simplified block diagram of an exemplary one-time password system in an illustrative embodiment of the invention.

FIG. 1 shows a simplified one-time password system 100 in one embodiment of the invention. The system 100 includes a multimedia device 102, a computer 104 and a network 106. The multimedia device 102 is able to communicate with the computer 104, for example, via an otherwise conventional wired or wireless connection. Similarly, the computer 104 communicates with network 106 in a conventional manner, which again may utilize a wired or wireless connection.

The multimedia device 102 in the illustrative embodiment comprises a digital audio player such as an MP3 player. A more particular example of a conventional digital audio player is the iPod from Apple Computer, Inc. of Cupertino, Calif., U.S.A. An iPod may also have digital video playback capability, as is well known. Other types of multimedia players that may be utilized in implementing the invention include, without limitation, digital video players, mobile telephones, personal digital assistants (PDAs), wireless email devices, portable computers, etc.

The computer 104 may be a desktop or portable personal computer, a microcomputer, a workstation, a mainframe computer, a wired telephone, a television set top box, or any other processing device which can serve as an intermediary between the multimedia device 102 and the network 106.

The network 106 is assumed to have associated therewith a validation service or other type of authentication authority that is capable of authenticating passwords submitted via the computer 104. Such an authority is not explicitly shown in the figure, but may be configured in a well-known conventional manner. It may comprise, for example, one or more servers accessible over the network 106.

Although the multimedia device 102 and computer 104 are shown as separate devices in FIG. 1, other embodiments of the invention may combine the functionality of these elements into a single processing device. For example, a given multimedia device may itself include a network interface, such that it can connect directly to the network 106 without the use of a separate intermediary device such as computer 104.

The network 106 may comprise, for example, a global computer network such as the Internet, a wide area network (WAN), a local area network (LAN), a satellite network, a telephone or cable network, or various portions or combinations of these and other types of networks.

It is to be appreciated that a given embodiment of the system 100 may include multiple instances of multimedia device 102, computer 104 and network 106, as well as additional or alternative elements, although only single instances of elements 102, 104 and 106 are shown in the simplified system diagram for clarity of illustration.

Figure 2:
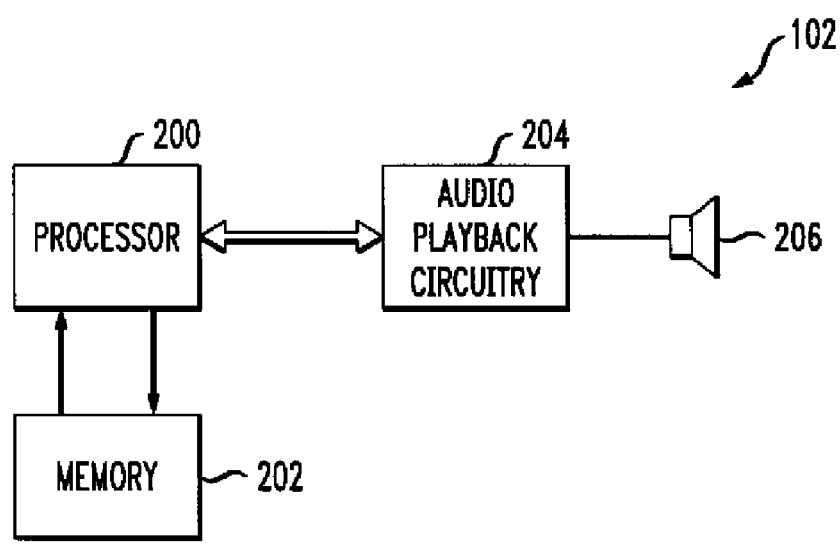
FIG. 2 shows one possible implementation of a given processing device of the FIG. 1 system.

FIG. 2 shows a more detailed view of the multimedia device 102 of FIG. 1. As indicated above, such a device is an example of what is more generally referred to herein as a processing device. The processing device 102 in this implementation includes a processor 200 coupled to a memory 202 and to audio playback circuitry 204. These device elements may be implemented in whole or in part as a conventional microprocessor, digital signal processor, application-specific integrated circuit (ASIC) or other type of circuitry, as well as portions or combinations of such circuitry elements.

Audio output generated by the audio playback circuitry 204 is presented in audible form via a speaker 206. Such circuitry may comprise, for example, conventional audio playback circuitry commonly associated with a digital audio player such as the above-noted ipod. It is to be appreciated that the present invention does not require any particular type of audio playback circuitry, and any such circuitry utilizable for playing MP3 files or other audio files may be used in a given embodiment. The configuration and operation of such circuitry is well known to those skilled in the art, and therefore not described in detail herein.

As indicated previously, alternative embodiments of the invention may utilize other types of multimedia files and multimedia devices to present one-time passwords to users. For example, video one-time passwords may be presented via playback of multimedia files containing video, using a multimedia device that comprises video playback circuitry in addition to or in place of audio playback circuitry 204.

In operation, the processor 200 controls the storage in memory 202 of at least one audio file containing a one-time password that is generated externally to the multimedia device 102. The audio file may be a digital audio file, e.g., an MP3 file, although the invention does not require any particular audio file format. Further, the processor 200 controls the playback of the audio file via the audio playback circuitry 204 and speaker 206 to make the one-time password audibly apparent to an associated user.

As will be appreciated by those skilled in the art, portions of a one-time password technique in accordance with an embodiment of the invention can be implemented at least in part in the form of one or more software programs that are stored in memory 202 and executed by the corresponding processor 200. Thus, the memory 202, in addition to storing digital audio files which contain passwords, is also used to store program instructions and other information used to perform operations associated with one-time passwords. Memory 202 may comprise multiple physically-separate storage elements of various types, such as an electronic memory, a disk-based memory, etc.

The multimedia device 102 as shown in FIG. 2 need not include a network interface if the device 102 interfaces with network 106 via an intermediary device such as computer 104 as shown in FIG. 1. In such an arrangement, it is sufficient for only the computer 104 to contain a network interface, and the multimedia device need not be so equipped. As mentioned previously, however, it is possible for a multimedia device in other embodiments to have its own network interface to communicate directly with the network 106 for certain purposes, such as for the purpose of obtaining a set of provisioned one-time passwords as will be described below in conjunction with FIG. 4.

As noted above, multimedia device 102 may be an otherwise conventional digital audio player, such as an MP3 player, that is configured to present one-time passwords to an associated user by playing one or more audio files. Thus, this illustrative embodiment utilizes the multimedia device 102 in a natural media playing mode to achieve the benefits of one-time password technology. In particular, the multimedia device in this embodiment need not generate a one-time password as a function of a secret seed for this purpose, but instead need only present the password in an audible format to the user.

The illustrative embodiment advantageously employs the media playing function of the multimedia device itself to present the one-time password to the user. Thus, instead of generating the one-time password from a downloaded seed, as in a conventional one-time password device, the multimedia device instead downloads a set of one-time passwords as multimedia files, e.g., MP3 files or other types of audio files. A given multimedia file in this embodiment would typically contain at least an audio version of the corresponding one-time password. Further, instead of displaying a generated one-time password in textual form on a screen, the multimedia device in the present embodiment simply plays the multimedia file. The user hears the one-time password when the file is played.

The one-time passwords generated from multimedia files in an audible format as described above are also referred to herein as "tune-codes," a confluence of "token-code" and "tune." The multimedia files themselves are referred to as tune-code files.

The above-described arrangement provides an improved one-time password system. To authenticate the user, an application prompts the user to listen to one of the tune-code files on the multimedia device. The user then plays the file, and hears the one-time password: "Your one-time password is 314159." The user enters the one-time password into the application. The application authenticates the user just as if the one-time password had been generated by a conventional text-based one-time password device.

Figure 3:
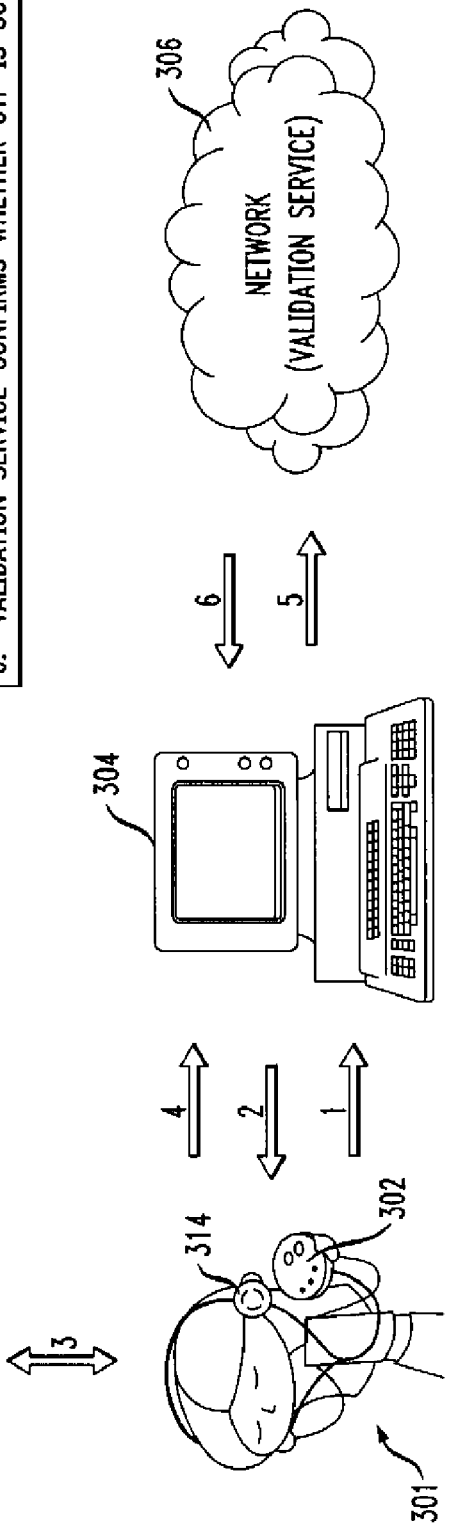

Referring now to FIG. 3, a one-time password system 300 similar to the system 100 of FIG. 1 is shown. In this embodiment, a multimedia device 302 comprises a digital audio player, e.g., an MP3 player. A user 301 equipped with the device 302 interacts with a computer 304 which is coupled to a network 306 supporting a password validation service. The multimedia device 302 includes selection controls 310, a display screen 312 and a speaker in the form of ear phones 314 that are coupled (either by wired or wireless connection) to an audio output of the device.

Operation of the system 300 in providing a given one-time password (OTP) to user 301 and validating the one-time password as submitted by the user involves Steps 1 through 6 as shown in the figure.

In Step 1, the user 301 starts an application on the computer 304. This application may be any access-controlled application or other software program that requires entry of a password by a user.

In Step 2, the application running on computer 304 requests a one-time password from the user 301.

In Step 3, the user 301 listens to a particular tune-code file on the multimedia device 302 to obtain a corresponding one-time password.

In Step 4, the user 301 enters the one-time password into the computer 304.

In Step 5, the application running on the computer 304 sends the one-time password to a validation service accessible via the network 306.

In Step 6, the validation service confirms whether the one-time password is correct.

Of course, the particular process steps shown in this embodiment should not be viewed as requirements of the invention, and may be altered in other embodiments.

In the illustrative embodiments of the invention as described above, the one-time password is distributed to the multimedia device as one or more audio files, such that no seed storage, one-time password generation or conversion of generated passwords to audio is required on the device side. It is also possible that the one-time password could be distributed to the multimedia device in text or numeric form, and converted to output audio (and/or video) there (either during the provisioning process, or the authentication process). In that case, no seed storage or one-time password generation would be required on the device side, only the conversion to audio. These arrangements are in contrast to conventional one-time password systems that may include an option for presenting a one-time password in an audio form, an example being the RSA SecurID® "Talking Token" described in "Buyer Protection," RSA Vantage Magazine, Fall 2004. In such conventional systems, a seed is stored on the device, a one-time password is generated on the device in text or numeric form, and then the one-time password is converted to audio. As indicated above, the illustrative embodiments advantageously avoid the need to store the seed on the device and to generate the password on the device, Other conventional arrangements deliver a one-time password in real time to a mobile telephone. The one-time password may be specific to a transaction. An example is described in "ASB Bank Selects RSA® Mobile Two-Factor Authentication for Internet Security," RSA Security press release, Jun. 18, 2003. However, the illustrative embodiments avoid the need for a real-time connection from the device to the source of one-time passwords.

As indicated above, a one-time password in the illustrative embodiments may comprise any type of authentication data. The one-time password would typically comprise a sequence of symbols that can be easily heard and entered by a user, such as a text or numeric string. Another example is to use a password comprising a sequence of words. Such a password is also referred to herein as a pass phrase. It is possible to achieve a level of security comparable to that of a modest-sized numeric string with two or three words selected from a relatively small dictionary. As a more particular example, the following audio output may be presented to a user: "Your one-time pass phrase is Square Root." Many users may find it easier to transcribe a short pass phrase than multiple digits of a text or numeric string.

It should be noted that a one-time password may be communicated from the multimedia device 102 to the computer 104 without user intervention. Such an arrangement may make use of voice recognition by the computer, or other signal processing techniques. Thus, for example, a tune-code could be played into the computer's microphone, or a tune-code multimedia file could be downloaded back to the computer and transcribed there.

The tune-codes of the above-described embodiments can be employed wherever conventional one-time passwords are employed. This would include authentication to a personal computer, application, network, Web server or other authenticating entity, and would include disconnected authentication as described in, for example, U.S. Patent Application Publication No. 2005/0166263, entitled "System and Method Providing Disconnected Authentication," which is incorporated by reference herein. In the case of disconnected authentication, the network is not involved during the validation operation, and thus steps 5 and 6 of the FIG. 3 embodiment would be omitted. Instead of these steps, the computer 304 would itself confirm whether the one-time password is correct.

A given tune-code could be accepted for a regular authentication operation, an "emergency access" operation (e.g., when the user has forgotten a password), or both, as well as for other types of authentication operations.

The computer 104 or 304 may perform cryptographic operations on a one-time password prior to forwarding it, as described in, for example, U.S. Patent Application Publication No. 2006/0041759, entitled "Password-Protection Module," which is incorporated by reference herein.

Also, if a given security policy allows a password to be used more than once, then the same tune-code could be employed more than once. Thus, as indicated previously herein, the disclosed arrangements are not limited to one-time passwords.

Because the tune-code in the above-described embodiments is an actual one-time password, it is independent of any particular password generating algorithm. The one-time password can therefore be generated by any of a variety of algorithms. For instance, it could be generated as a function of an index value and a secret seed, where the index value can be part of the tune-code file name and/or part of the one-time password. The index values for different tune-codes could be assigned sequentially (analogous to an "event-based" one-time password system), randomly (more analogous to a "challenge-response" system), or using other techniques.

The one-time password could also be computed as a function of time, either in addition to or instead of the index value. This time would preferably correspond to a longer time period such as an hour or a day, rather than a minute as in a typical conventional time-based one-time password system. Otherwise, it may be difficult for the user to select the current tune-code on the device. The seed from which the one-time password is derived could also be derived from another seed, for instance as a function of time period and/or verifier.

The one-time passwords could also just be generated by the system as random values, without any particular algorithm or seed. In this case, the system may store the one-time passwords, or hashes or other functions thereof, for subsequent comparison. Such one-time passwords may still be associated with an index value for storage purposes, but need not be a cryptographic function of the index.

Depending on the type of one-time password, the user might select the tune-code to play, or the application might specify which tune-code to play, for instance by name. The user can easily select the appropriate tune-code in either case via the normal menuing system for selecting other multimedia files, e.g., by album and title.

The tune-code files in the illustrative embodiments are distinct from conventional media files in that tune-codes are typically computer-generated and personalized to a user. Conventional media files, in contrast, are obtained from a recording. The recording may itself include some computer-synthesized portions, or may even be entirely computer synthesized, but the computer generation in this case is generally artistic, not functional. With regard to personalization, each user generally receives a different set of tune-codes. With conventional media, the same file is typically sent to multiple users. Those files actually may have internal differences or watermarking to facilitate the detection of unauthorized copying. However, the differences are intended to be difficult for the user to detect simply by playing the file. In contrast, differences in tune-codes can be easily detected because they correspond to different one-time passwords.

Tune-codes can be managed on the multimedia device in substantially the same way as typical media files. They can be purchased, downloaded, organized, copied, played, and deleted through the same widely available applications and interfaces as typical media files, which is very convenient for the typical user.

Like a conventional one-time password, a tune-code may be validated in a wide variety of different ways. For example, an application or Web site employing one-time passwords could compare the value presented by the user against previously stored one-time passwords. Alternatively, it could hash the presented value and compare the result against previously stored hashes, using techniques similar to those disclosed in the above-cited U.S. Patent Application Publication No. 2005/0166263. It could also regenerate one or more acceptable one-time passwords from a stored seed and compare them with the received value, as is typical in the aforementioned RSA SecurID® and similar user authentication systems.

As is done with conventional one-time passwords, the application or Web site could employ a network service for validating the one-time password. A given one-time password might be accepted only by a single application or Web site, or it might be accepted in multiple places, for instance, as described in U.S. Patent Application Publication No. 2006/0174104, entitled "Consumer Internet Authentication Device," which is incorporated by reference herein. An application or Web site might also require that the user present other authentication factors, such as a personal identification number (PIN), in addition to the one-time password, before validating the one-time password.

The provisioning of tune-codes to a given multimedia device may require some degree of authentication to prevent unauthorized users from obtaining tune-codes for a different user. Digital Rights Management (DRM) could play a useful role as these are the kinds of files that users would probably not want to share. Tune-codes, like conventional media, would either be downloaded directly to a multimedia device, or first to a computer which would then be synchronized with the multimedia device.

FIG. 4 illustrates one possible process for provisioning a set of tune-codes to multimedia device 302 in the system 300. In this example, a Web site or other provisioning service is associated with a network 306, and the user obtains the tune-codes from the provisioning service via the computer 304.

Operation of the system 300 in provisioning a set of tune-codes to multimedia device 302 involves Steps 1 through 4 as shown in the figure.

In Step 1, the user 301 starts a provisioning application on the computer 304.

In Step 2, the application requests new tune-codes from the provisioning service associated with the network 306.

In Step 3, the provisioning service downloads the new tune-codes to the computer 304.

In Step 4, the computer 304 downloads the tune-codes to the multimedia device 302.

Again, these particular process steps are exemplary only, and may be altered in other embodiments. For instance, the provisioning application may run on the multimedia device 302, and/or the tune-codes may be downloaded directly from the provisioning service to the multimedia device 302.

Any of a variety of media formats could be employed for distributing the tune-codes, and the format for distributing a tune-code need not be the same as the one in which the tune-code is stored on the multimedia device. For example, multiple tune-codes could be distributed as an "album" or in other hierarchical formats. It is convenient if a tune-code can be encoded in an audio format directly by the provisioning service, but it is also possible that intermediaries such as the computers 104, 304 or even the multimedia devices 102, 302 themselves could participate in the encoding process.

Tune-codes need not be associated with a specific named user, but may instead be associated with an identifier, such as a serial number. As in conventional one-time password systems involving a network service, the serial number would be registered with applications, Web sites or other entities to which the user intends to authenticate via the associated one-time passwords. The application, Web site or other authenticating entity would refer to the serial number, or a suitable pseudonym of the user, when presenting the one-time password to a network service for validation. This allows the identity of the user to the service to be distinct from his or her identity to the applications, Web sites or other authenticating entities.

It is to be appreciated that the above-described embodiments are presented by way of illustrative example only. Numerous extensions and variations of the described techniques are possible, a few of which are outlined below.

A text or numeric version of the one-time password may be displayed on a screen area of the multimedia device as the tune-code is playing, and/or at least a portion of the one-time password may be included in the file name or title of the tune-code. This would provide an additional means of conveying the one-time password to the user. The file name may also or alternatively include at least a portion of a time or index value used to generate the password. Although displaying the one-time password and/or including it in the file name or title might itself be sufficient to enable the broader use of one-time passwords, without the use of audio at all, audio has several advantages. First, the user can play a tune-code discreetly, e.g., through headphones. Second, the user can return focus to the computer screen after selecting the tune-code, rather than alternately looking at the device and typing. Many users may find it easier to type what they hear than to type what they read. Third, a tune-code file presents a richer means for providing additional information to the user than does the small screen area of typical multimedia devices.

The sound of the one-time password may be embedded in background noise to increase the difficulty of automated recognition of the one-time password by a computer should the file be intercepted. This is a form of CAPTCHA (Completely Automated Public Turing Test to Tell Computers and Humans Apart). The security of this CAPTCHA is based on the "cocktail party problem" of isolating a single voice in a crowded room, which is currently much harder for computers to solve than humans. See S. Haykin et al., "The cocktail party problem," Neural Computation, 2005 (17): 1875-1902.

Help messages and other user guidance may be added to a tune-code file, like "Please be careful about clicking on links in e-mail" or "Press 1 to hear the one-time password again." The advent of interactive audio on multimedia devices will facilitate such features. See, for example, www.sonify.org, an organization formed to assist web, wireless and application developers in adding interactive audio to their projects.

It is also possible to add advertising content to tune-codes, for example, "Visit<Web site>", "Brought to you by<name of bank>", etc.

Tune-codes may be organized into folders according to the Web sites that accept them, and/or time period or other factors. The provisioning process can be configured to assist the user with such organization.

Tune-codes may be associated with particular functions. For example, a given set of tune-codes might be employed for initial authentication only, and other sets for authorizing various transactions. As another example, a particular tune-code might authorize transactions only up to a certain amount. Such tune-codes could be organized into folders and/or named according to their functions.

Tune-code files may be deleted after they are played, or after a certain time period. This could happen automatically with an appropriate DRM system.

A series of tune-codes may be delivered automatically via Apple iPod "podCasts" and similar forms of media broadcasts.

Tune-codes may be delivered as voice mail messages. For example, the user may register one or more voice mailbox numbers to which a set of tune-codes would be sent periodically. The tune-codes would go directly to voice mail for the user to check when needed for authentication. The user may check voice mail during a transaction, but would not need to, since the user can check voice mail and get the current one-time password beforehand. In such an arrangement, the voice mail system itself may be configured to support storage and playback of tune-codes as multimedia files. Any system that is so configured is considered to be a type of processing device as that term is used herein. It should be noted that a provisioning service may call the voice mail system and leave a conventional audio recording with the tune-code. Again, the user would obtain the tune-code by listening to the corresponding voice mail message. By calling a particular voice mailbox number, such a processing device of the provisioning system makes the tune-code apparent to the user. The multimedia file in this case is the voice mail message.

Authentication measures may be required on the multimedia device before access to one or more tune-codes is provided, for example, entry of a PIN or a biometric.

Information may also be provided to the user indicating how to authenticate a Web site, such as telling the user what patterns to look for on the computer screen either before or after entering the one-time password. These may be combined with other security layers in a full solution. For instance, to deter a real-time "man-in-the-middle" attack, the application or Web site might check characteristics of the user's computer prior to sending the patterns. The user would enter the one-time password after checking the patterns. If the mutual authentication option described in the above-cited U.S. Patent application publication Ser. No. 2006/0041759 is employed to protect the one-time password from such an attack, the user could check the patterns after entering the one-time password. See also U.S. Pat. No. 7,100,049, entitled "Method and Apparatus for Authentication of Users and Web Sites," which is incorporated by reference herein, where a disclosed arrangement allows the user to check the pattern before entering the one-time password.

Other kinds of one-time user authentication may also be supported. For example, the user might be instructed to click in certain positions on an image, browse to a specific Web address, solve a puzzle, etc. Such authentication data could be provided in conjunction with another type of one-time password, or could serve as the password. The validation process would be adapted accordingly, in a straightforward manner.

The language or voice in which the one-time password is presented could be customized based on user or system preferences. Celebrity voices could be offered: "Go ahead, make my day, hacker! The one-time password is 271828." Thus, a given user may be permitted to select among a set of celebrity or other custom styles for reading, singing or otherwise presenting a tune-code.

As indicated previously, video one-time passwords may be presented visually via a multimedia device using techniques similar to those described above, with or without accompanying audio. Such passwords may, for example, be embedded in the above-noted CAPTCHAs, or otherwise presented via conventional video playback circuitry such as that found in an iPod with video capability. A video file containing a one-time password is considered a type of multimedia file as that term is used herein. One way to display a one-time password in video form is as a changing subtitle or watermark on a video track. This makes it convenient for the user to view the one-time password while watching a conventional video file. Superimposing the changing value also makes copying and redistributing the video much less attractive. The value could change very rapidly, so as to be best viewed when the video player is paused.

It was mentioned above that tune-codes may be used for emergency access. Such emergency access is a common user requirement. If a user forgets a password and/or a conventional authentication device, the user would typically call a help desk for support. To reduce help desk costs and increase user convenience, it is beneficial to have an alternate "backup" or "emergency" form of authentication available. In particular, tune-codes could be used for emergency access if and when the user's conventional device is unavailable. The tune-codes could be distributed to the user's multimedia device when the user first registers the conventional device with an authentication system, or later in the device lifecycle, by any of the means described above. The backup tune-codes could also be distributed on demand via a self-service web page, after the user authenticates with other factors (e.g., answering challenge questions).

Since a tune-code can be used in place of a conventional one-time password, the applications with which the user interacts do not need to be modified in order to accept one-time passwords originating from tune-codes. However, the validation service is able to recognize that a tune-code has been presented. In such a case, the validation service can mark the user's conventional authentication device as being lost or misplaced. Authentication events of this class might be reported to the user and administrators for follow up. One-time passwords corresponding to the conventional device might then be rejected for some period of time, until the user reports the conventional device as having been recovered.

The use of tune-codes as a backup authentication mechanism has at least two advantages. First, the user does not need to call a help desk. Second, the user does not even need to visit a self-service web page (which might not even be available if the user is authenticating offline). The user just enters the one-time password obtained from the previously provisioned tune-code. A user could of course always use tune-codes rather than a conventional authentication device. Having both options offers a tradeoff in convenience: The conventional device may be easier to use (just read the displayed value), but the multimedia device is less likely to be misplaced (always carry it).

A variety of business models can be combined with the distribution of tune-codes. For instance, tune-codes could be distributed along with a conventional audio or video file. Users might pay for the tune-codes and get the audio or video file for free, or vice versa.

As another possible variant, instead of using a network-based provisioning protocol, the multimedia device could be provisioned locally, for instance by an administrator or at a manufacturing site. For instance, a company that distributes MP3 players to its users could pre-program each such device with a corresponding set of tune-codes. Alternatively, a vendor of such devices could pre-program sets of tune-codes before the devices are sold. The tune-codes may be employed in any of the embodiments already described, and the user would not need a separate provisioning step.

Traditionally, one-time password systems required a device to store a seed and generate one-time passwords from the seed, because of the significant cost of storage in portable devices. The advent of multimedia devices with substantial storage space has changed the situation dramatically. Inexpensive portable devices are available that can store hundreds of millions of bytes of data. This functionality makes it possible to store the large number of tune-codes that may be required in a given embodiment.

The advances also enable the storage of one-time passwords simply as text to be presented to the user on a display. In other words, instead of storing a seed, generating a sequence of one-time passwords from the seed, and displaying the one-time passwords, a device could equally well store the one-time passwords and display them as needed. Like tune-codes, the text one-time passwords could be provisioned in a variety of different ways.

One advantage of this arrangement—as well as with the tune-code approach—is that there is no longer a concern about side-channel attacks on the seed. There is no seed on the device whose presence in generation operations might be analyzed. There are only independent memory values, internal to the device, that are read immediately prior to being displayed. Side-channel analysis on the read/display operation would offer no additional information on other values.

Another advantage is that it is possible to store a subset of all the one-time passwords that could potentially be generated from the seed. This would minimize the impact on security should the token be stolen and its memory analyzed.

Finally, with stored as opposed to generated one-time passwords, there is no need to have a generation algorithm or seed at all. The one-time passwords can be entirely random, thereby avoiding concerns with the security of the generation algorithm. Of course, if the one-time passwords are entirely random, then the same one-time passwords (or information related to them) would need to be stored by the validation service. But reductions in storage cost apply there as well.

It should again be emphasized that the particular one-time password techniques described above are provided by way of illustration, and should not be construed as limiting the present invention to any specific embodiment or group of embodiments. For example, as previously noted, the described embodiments may be adapted in a straightforward manner to operate with passwords that can each be used multiple times, rather than just one-time passwords, and in conjunction with other types of access-controlled resources. Advantageously, the illustrative embodiments do not require significant changes to existing audio or video players or other multimedia devices. Also, the particular configuration of system elements shown in FIGS. 1 and 2, and their interactions as shown in FIGS. 3 and 4, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A processing device comprising:
a memory;
a processor coupled to the memory; and
playback circuitry coupled to the processor;
the processor being operative to control the storage in said memory of at least one multimedia file containing a password, where the password is generated externally to the processing device, and to control the playback of the multimedia file via the playback circuitry to make the password accessible to an associated entity;
wherein playback of the multimedia file makes the password at least one of audibly apparent and visually apparent.

2. The processing device of claim 1 wherein the associated entity comprises a user of the processing device.

3. The processing device of claim 1 wherein the associated entity comprises a computer proximate to the processing device.

4. The processing device of claim 1 wherein the password comprises a one-time password.

5. The processing device of claim 1 wherein said device comprises a portable multimedia player.

6. The processing device of claim 2 wherein said multimedia file comprises an audio file and the password is presented to the user in audible form.

7. The processing device of claim 1 wherein said playback circuitry comprises audio playback circuitry.

8. The processing device of claim 1 wherein the processing device is configured to download the multimedia file containing the password from a computer coupled to a network.

9. The processing device of claim 1 wherein the password is generated externally to the processing device as a function of an index value and a secret seed.

10. The processing device of claim 1 wherein the password is generated externally to the processing device as a function of a time value and a secret seed.

11. The processing device of claim 2 further comprising a user interface configured to permit the user to select for playback a particular one of a plurality of multimedia files stored in the memory and containing respective passwords.

12. The processing device of claim 2 wherein the device is operative to provide the user with an indication of which of a plurality of multimedia files stored in the memory and containing respective passwords should be selected for playback at a given point in time.

13. The processing device of claim 1 wherein the memory stores a plurality of multimedia files containing respective passwords.

14. The processing device of claim 13 wherein the multimedia files containing respective passwords are stored in the form of a hierarchy.

15. The processing device of claim 2 wherein the multimedia file containing the password also contains a user guidance message that is made apparent to the user when the multimedia file is played back via the playback circuitry.

16. The processing device of claim 2 wherein the multimedia file containing the password also contains at least one advertisement that is made apparent to the user when the multimedia file is played back via the playback circuitry.

17. The processing device of claim 1 wherein the multimedia file further comprises information which specifies at least one limitation regarding conditions under which the password may be utilized.

18. The processing device of claim 2 wherein the processing device is configured to permit the user to select among a plurality of different presentation styles for presentation of the password by the processing device.

19. The processing device of claim 1 wherein the multimedia file is delivered to the processing device via a media broadcast channel.

20. The processing device of claim 1 wherein a file name of the multimedia file includes at least a portion of the password.

21. The processing device of claim 2 wherein the multimedia file comprises a video file and the password is presented to the user in a visible form.

22. A processing device comprising:
a memory; and
a processor coupled to the memory;
the processor being operative to control the storage in said memory of at least one multimedia file containing a password, where the password is generated externally to the processing device, and to control the transfer of the multimedia file to another processing device so as to make the password accessible to the other processing device;
wherein playback of the multimedia file makes the password at least one of audibly apparent and visually apparent.

23. A processing device comprising:
a memory;
a processor coupled to the memory; and
playback circuitry coupled to the processor;
the processor being operative to convert a password generated externally to the processing device into a multimedia file that is played back by the playback circuitry to make the password accessible to an associated entity;
wherein playback of the multimedia file makes the password at least one of audibly apparent and visually apparent.

24. A method of providing a password via a processing device, the method comprising the steps of:
storing in the processing device at least one multimedia file containing a password where the password is generated externally to the processing device; and
playing back the multimedia file on the processing device to make the password accessible to an associated entity;
wherein playback of the multimedia file makes the password at least one of audibly apparent and visually apparent.

25. The method of claim 24 wherein the associated entity comprises a user of the processing device.

26. The method of claim 25 wherein the multimedia file comprises an audio file and the password is presented to the user in an audible form.

27. The method of claim 25 wherein the multimedia file comprises a video file and the password is presented to the user in a visible form.

28. A machine-readable non-transitory storage medium having embodied therein executable code of one or more software programs for use in providing a password via a processing device, wherein the one or more software programs when executed by the processing device implement the steps of the method of claim 24.

* * * * *